United States Patent
McNally et al.

(10) Patent No.: US 8,417,700 B2
(45) Date of Patent: Apr. 9, 2013

(54) INTERACTIVE TOOL FOR CONSTRUCTING AND EDITING PROCESS DIAGRAMS

(75) Inventors: Robert Christopher McNally, Glendora, CA (US); William Daniel Hillis, Encino, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1893 days.

(21) Appl. No.: 11/292,242

(22) Filed: Dec. 1, 2005

(65) Prior Publication Data
US 2007/0130193 A1 Jun. 7, 2007

(51) Int. Cl.
*G06F 7/00* (2006.01)

(52) U.S. Cl. ...................................... 707/736

(58) Field of Classification Search ............... 707/104.1, 707/100, 10, 1, 736, 999.102, 999.101
See application file for complete search history.

(56) References Cited

U.S. PATENT DOCUMENTS

| | | | |
|---|---|---|---|
| 5,623,681 A * | 4/1997 | Rivette et al. | 715/255 |
| 5,721,900 A * | 2/1998 | Banning et al. | 1/1 |
| 5,832,494 A * | 11/1998 | Egger et al. | 707/999.005 |
| 5,852,449 A | 12/1998 | Esslinger et al. | |
| 5,991,780 A * | 11/1999 | Rivette et al. | 715/255 |
| 5,995,106 A * | 11/1999 | Naughton et al. | 715/854 |
| 6,003,040 A * | 12/1999 | Mital et al. | 717/165 |
| 6,092,050 A | 7/2000 | Lungren et al. | |
| 6,110,223 A | 8/2000 | Southgate et al. | |
| 6,233,571 B1 * | 5/2001 | Egger et al. | 707/999.002 |
| 6,323,882 B1 | 11/2001 | Jerome et al. | |
| 6,732,114 B1 | 5/2004 | Aamodt et al. | |
| 6,735,596 B2 * | 5/2004 | Corynen | 707/102 |
| 2003/0131007 A1* | 7/2003 | Schirmer et al. | 707/100 |
| 2004/0186915 A1 | 9/2004 | Blaszczak et al. | |
| 2005/0060252 A1 | 3/2005 | Doddington | |

FOREIGN PATENT DOCUMENTS

GB 2 351 580 A 1/2001

OTHER PUBLICATIONS

Search Report for corresponding EP 06 02 4939 completed May 9, 2007.

* cited by examiner

*Primary Examiner* — Khanh Pham
*Assistant Examiner* — Eliyah S Harper
(74) *Attorney, Agent, or Firm* — Tarolli, Sundheim, Covell & Tummino LLP

(57) ABSTRACT

Systems and methods are provided for assisting a user in creating a process diagram according to a specific methodology. A template library includes a plurality of entities associated with the methodology. Each of the plurality of entities has an associated one of a plurality of entity categories. A user interface allows a user to insert entities from the library into the process diagram and insert connections between the entities to show logical relationships between the entities. A graphical engine generates an optimal arrangement of the entities within the process diagram according to at least one characteristic of a plurality of entities and at least one connector associated with the process diagram and at least one optimization criteria when a user inserts an entity or connection. The graphical engine is operative to animate a transition between an original arrangement and the optimal arrangement.

18 Claims, 3 Drawing Sheets

INTERACTIVE TOOL FOR CONSTRUCTING AND EDITING PROCESS DIAGRAMS

TECHNICAL FIELD

The present invention relates to assisted decision making applications and, more particularly, to an interactive tool for constructing and editing a process diagram.

BACKGROUND OF THE INVENTION

In the past, decisions frequently had to be made on minimal amounts of available data. Information traveled slowly, and what information was available could be considered by a human mind. Frequently, the greatest problem facing a decision maker was a paucity of information. Advances in information gathering and transmittal technologies have reversed this trend, making it easier to gather large amounts of information pertaining to a particular problem. A major task facing modern day decision makers is filtering and organizing the received information into a useful form.

While automated classification and decision making systems have become increasingly sophisticated, the human mind still outperforms automated systems on most real-world tasks. A limitation of human decision making, however, is the inability of human beings to simultaneously consider a large number of factors. Decision makers often find it difficult to mentally combine large amounts of evidence. It is often necessary for a human decision maker to visualize a process in its entirety to truly comprehend the available options and arrive at an optimal course of action. Static sketches of complex processes are unwieldy, often requiring manual arrangement of the elements of the process diagram. Computerized tools are available to aid in the construction of a process diagram, but they are frequently nonintuitive and inconvenient to use.

SUMMARY OF THE INVENTION

In accordance with one aspect of the invention, a system is provided that assists a user in creating a process diagram according to a specific methodology. A template library includes a plurality of entities associated with the methodology. Each of the plurality of entities has an associated one of a plurality of entity categories. A user interface allows a user to insert entities from the library into the process diagram and insert connections between the entities to show logical relationships between the entities. A graphical engine generates an optimal arrangement of the entities within the process diagram according to at least one characteristic of a plurality of entities and at least one connector associated with the process diagram and at least one optimization criteria when a user inserts an entity or connection. The graphical engine is operative to animate a transition between an original arrangement and the optimal arrangement.

In accordance with another aspect of the invention, a computer readable medium having computer executable instructions is provided for generating a process diagram according to a specific methodology. A template library includes a plurality of entities associated with the methodology. Each of the plurality of entities has an associated one of a plurality of entity categories. A user interface allows a user to add entities to the process diagram and connect a first entity to an object associated with a second entity within the diagram. A graphical engine displays a logical relationship between the first entity and the second entity as a connector according to at least one characteristic of the object.

In accordance with yet another aspect of the invention, a method is provided for editing a process diagram. The process diagram includes a plurality of objects including entities and connectors between entities. A logical relationship between two entities is determined according to input from a user. An optimal arrangement of objects within the process diagram is determined that illustrates the determined logical relationship according to at least one characteristic of the objects and at least one optimization criteria. A transition between an existing arrangement and the optimal arrangement is animated such that the user can track the location of an entity of interest from the existing arrangement to the optimal arrangement.

DETAILED DESCRIPTION OF INVENTION

Figure 1:
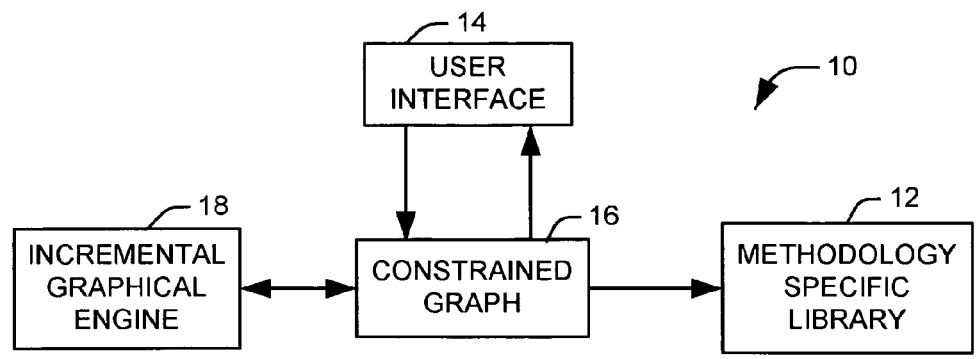
FIG. 1 illustrates a system for generating and editing a process diagram in accordance with an aspect of the present invention.

The present invention relates to systems and methods for constructing and editing process diagrams. The present invention has broad applicability to decision making in circumstances where the goals, facts, actions, and consequences associated with a process are complex and not readily understood by a human mind. A system in accordance with an aspect of the present invention is configured such that the user is not troubled with the details of the graphic display of the diagram. One or more of the color, font, layout, and arrangement of the graphic display is fixed and/or automated to maintain the appearance of the graphical display outside of a user's control. Accordingly, the user can concentrate exclusively on the logical relationships represented by the diagram. It will be appreciated that the present invention can be employed in any decision making applications in which complex processes are considered. The systems and methods of the present invention can be applied, for example, to applications ranging from high-level government policy to procurement decisions in a small business.

In accordance with an aspect of the present invention, the user interface of the system is constrained to maintain the user's focus on the substance of the process diagram. The appearance of the display provided to the user is fixed according to a global template, which optionally can be edited by the user or an administrator. Accordingly, the color of the various objects, the font associated with each object, and the symbolic representation of each object is maintained at a default setting by the system to avoid distractions to the user. The fixed font and color also allows the system to automatically generate new, readily legible arrangements of the objects without accounting for changes from the standard colors and font. The system can be operative to arrange the objects comprising the process diagram according to one or more optimization criteria each time an object is added, deleted, or moved. It will be appreciated, however, that this incremental updating of the diagram can be disorienting to the user, especially when the process diagram is large. To avoid distracting the user, the updating process can be animated over a short period of time or a number of video frames as to avoid an abrupt change in the appearance of the processing routine. In this incremental animation, each object is displayed as gradually and continuously moving across the process diagram from its previous position into its position in the updated arrangement. Also during the course of the animation, objects (entities and their connections) that have been deleted appear to simultaneously yet gradually fade away, while objects that have been created appear to simultaneously yet gradually appear. It will be appreciated that the time or number of frames allotted for the animation can be varied with the size of the diagram, such that the movement of one or more objects of current interest to the user can be readily tracked from the original arrangement to the updated arrangement.

FIG. 1 illustrates a system 10 for generating and editing a process diagram in accordance with the aspect of the present invention. A process diagram can include a plurality of entities, based on a specific methodology. Each entity can have a plurality of attributes, including but not limited to a truth value of true or false. In the present example, the truth value of a given entity can depend on one or more other entities, referred to as subordinate entities. For example, in a thought diagram based on a theory of constraints (TOC) methodology, the entities can include goals, intermediate goals, desirable and undesirable side effects, actions, and preconditions. Alternatively, the entities associated with another thought process methodology (e.g., a security decision-making methodology) might include requirements, knowledge, indicators, and events. Another alternative would be in Critical Path Project Management (CPM), where the entities would represent tasks and the attributes may include durations, resource, and required start and finish dates. The illustrated system 10 manages the presentation of the thought diagram, allowing the user to concentrate on the underlying logic of the diagram.

In a theory of constraints methodology, goal entities represent one or more final goals of the process diagram. Accordingly, the truth value of a goal entity will depend one at least one other entity and will never be determined by a user. Similarly, intermediate goal entities, desired side effect entities, and undesired side effect entities represent the positive and negative consequences of the actions and preconditions comprising the process diagram. These entities will always depend from one or more other entities, such that their truth values are not determined by a user. Unlike goal entities, however, these entities can also influence additional entities farther up the process diagram. Precondition entities represent facts that are beyond the control of the user, while action entities represent actions that can be taken by the user or the organization represented by the user. Precondition and action entities influence other entities and are not influenced by other entities. Accordingly, their truth value is determined by the user.

Similarly, the security decision making methodology can include requirement entities, which are items that should be reported on if they are believed to be true. Like the goal entities described above, the truth value of a requirement entity will depend on at least one other entity and will never be determined directly by a user. Indicator entities are facts that if true, indicate that a requirement entity may also be true. Accordingly, indicator entities are subordinate to requirement entities and will, in turn, depend on one or more event and knowledge entities. Event entities are essentially evidence that supports, or possibly refutes, indicators. Knowledge entities are known facts about the subject of interest. Knowledge and event entities influence other entities and are not influenced by other entities. Accordingly, their truth value is determined by the user.

The system 10 includes a library 12 that contains difference categories of entities specific to a given methodology. The entities associated with a given library will vary with the methodology, but in general, each category of entity will have one or more logical characteristics in relation to the other entities. For example, in a TOC methodology, a goal entity represents the culmination of the process, such that all other entities are subordinate to the goal entity.

A user can select entities from the library via a user interface 14 and insert them into the process diagram 16. For example, the user interface can include software for interfacing with one or more input devices and a display associated with the user. The user can label the objects, which are entities and logical connectors between entities, and provide associated annotations using a comment feature. The user can provide the logical connectors between two entities by drawing a single line between two objects associated with the entities, with the direction and nature of the connector determined according to the initial and destination points of the line and the associated categories of the entities.

Using the example of a TOC methodology, a goal entity can be connected to a precondition entity using a single line, and a graphical engine 18 associated with the system can arrange the two entities such that the goal entity is in a first layer of the process diagram and the precondition entity is subordinate to the goal entity. Other categories of entities may be placed, at least initially, in other default layers of the diagram according to their associated category. Similarly, the connectors can include "AND" and "OR" logical connectors, with the destination point of a given line utilized to distinguish between the AND and OR connectors. For example, an OR connector can be created when a line is drawn from a first entity to a second entity and an AND connector can be created when a line is drawn from a first entity to an existing connector between a second entity and a third entity. It will be appreciated that other categories of logical connectors (e.g., negation, exclusive OR, etc.) can be selectable via other means. Accordingly, common categories of logical connectors can be efficiently added to the process diagram 14 via a single gesture.

It will be appreciated that a user interface 14 associated with the system can be constrained as to maintain the user's focus on the logical structure of the process diagram 16. For example, the font and color of the entities and connectors as well as the layout of a display associated with the graphic user interface can be fixed according to a global template. In accordance with an aspect of the invention, this template can be altered by the user or an administrator, but the colors, fonts, connectors, and layout of a given process diagram are fixed.

Similarly, the arrangement of the entities and connectors within the process diagram 16 can be automated via the graphical engine 18, such that an appropriate arrangement can be maintained without requiring attention from the user.

In accordance with an aspect of the present invention, the graphical engine 18 is operative to provide incremental updating and animation of the process diagram 16 as new objects are added to the diagram. As each new connector or entity is added, the graphical engine 18 determines an optimal arrangement for the entities and connectors comprising the process diagram according to one or more optimization criteria. For example, the entities and connectors can be arranged as to maintain the flow of the diagram in a desired direction, avoid crossover of the connectors, and maintain a desired spacing between entities. To keep the user apprised of the location of the entities within the diagram, the graphical engine 18 is operative to animate the transitions when the entities and connectors are rearranged. The animation is conducted over the course of a predetermined number of video frames, allowing the user to visually follow any entities of interest during the transition. Accordingly, an optimal arrangement of the objects within the process diagram 16 can be maintained without drawing the user's attention away from the logical structure of the process diagram.

FIGS. 2-8 illustrate an exemplary process diagram through several stages of editing as a series of screenshots. For the sake of example, the process diagram is constructed in accordance with the theory of constraints methodology. The flow of the process diagram has been arbitrarily set as bottom to top, such that subordinate entities are preferably displayed below the entities whose logical value they influence. It will be appreciated that the screenshots represent an exemplary implementation of the system, and that a process diagram generated in accordance with an aspect of the present invention may have a different appearance, direction of flow, and underlying methodology.

Figure 2:
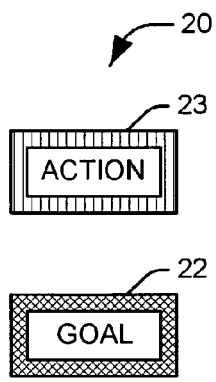
FIG. 2 illustrates a first exemplary screenshot of a process diagram in accordance with an aspect of the present invention.
Figure 3:
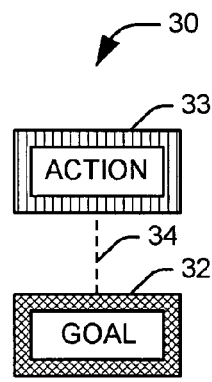
FIG. 3 illustrates a second exemplary screenshot of a process diagram in accordance with an aspect of the present invention.
Figure 4:
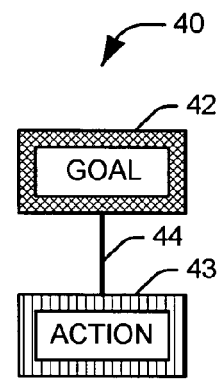
FIG. 4 illustrates a third exemplary screenshot of a process diagram in accordance with an aspect of the present invention.

FIG. 2 illustrates a first screenshot of a process diagram 20 having two unconnected entities, a goal entity 22 and an action entity 23. It will be appreciated that the goal entity 22 and action entity 23 have different background colors, the fixed colors representing their respective entity categories. FIG. 3 illustrates a second screenshot 30 in which the goal entity 32 and the action entity 33 are connected by a line 34 drawn by the user. FIG. 4 illustrates a third screenshot 40 in which the goal entity 42 and the action entity 43 have been rearranged, such that the action entity 43 is placed in a subordinate position to the goal entity 42. The two entities are joined by a connector 44 that illustrates the logical connection between the two entities. In accordance with an aspect of the present invention, the transition from the arrangement of the entities in FIG. 3 to the arrangement of the entities in FIG. 4 can be animated as to allow the user to keep track of the location of one or more entities of interest.

Figure 5:
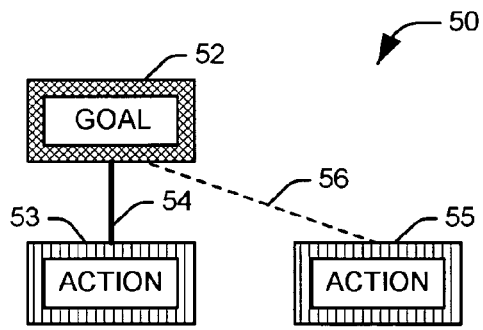
FIG. 5 illustrates a fourth exemplary screenshot of a process diagram in accordance with an aspect of the present invention.
Figure 6:
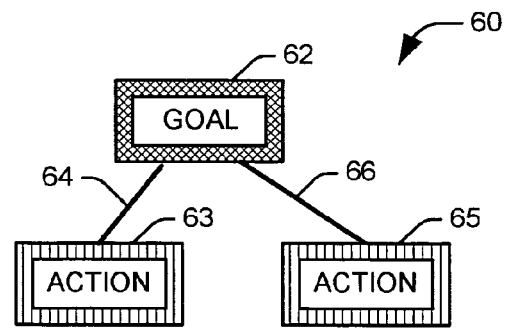
FIG. 6 illustrates a fifth exemplary screenshot of a process diagram in accordance with an aspect of the present invention.

FIG. 5 illustrates a fourth screenshot 50 in which the goal entity 52 and the action entity 53 are joined by a connector 54, and a second action entity 55 has been added to the diagram. In the illustrated screenshot 50, the user has already drawn a connecting line 56 between the second action entity 55 and the goal entity 52. It will be appreciated that the line is drawn directly to the body of the goal entity 52. FIG. 6 illustrates a fifth screenshot 60, comprising a goal entity 62 and a first action entity 63 joined by a first connector 64, and a second action entity 65 joined to the goal entity 62 by a second connector 66. The entities 62, 63, and 65 have been rearranged relative to their positions in FIG. 5, such that the first action entity 63 and the second action entity 65 are connected to the goal entity 62 in a logical OR arrangement. Accordingly, the goal entity 62 will assume a logical value of true when the logical value of either the first action entity 63 or the second action entity 65 is true. It will be appreciated that the OR relationship was determined and the rearranging of the entities was accomplished in response to the drawing a single line by the user.

Figure 7:
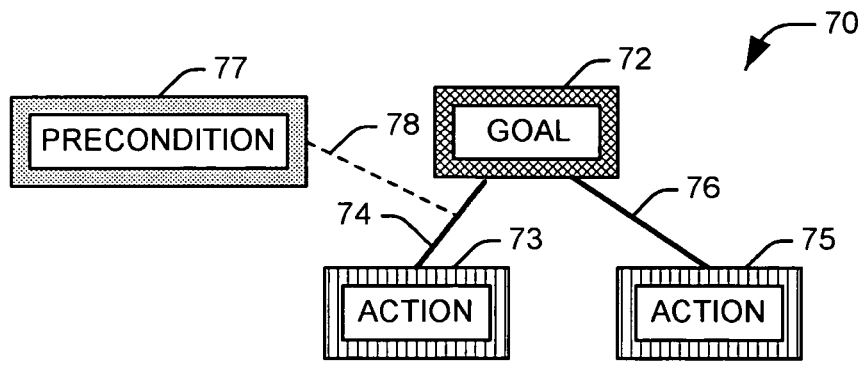
FIG. 7 illustrates a sixth exemplary screenshot of a process diagram in accordance with an aspect of the present invention.
Figure 8:
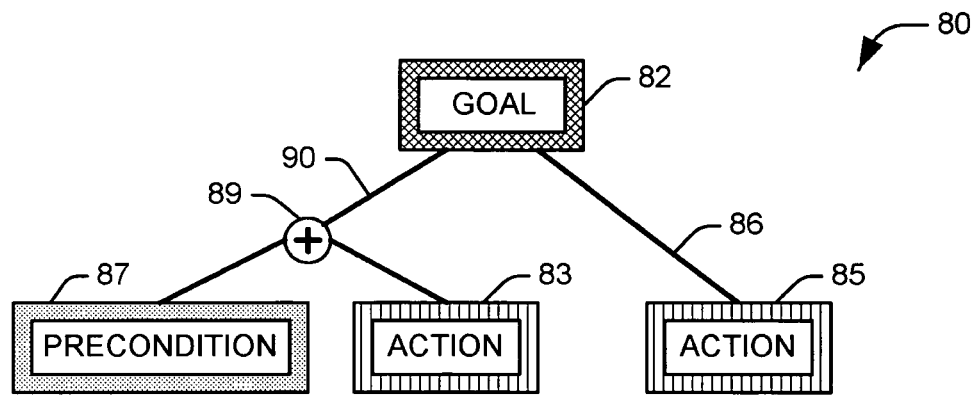
FIG. 8 illustrates a seventh exemplary screenshot of a process diagram in accordance with an aspect of the present invention.

FIG. 7 illustrates a sixth screenshot 70, comprising a goal entity 72 and an first action entity 73 joined by a first connector 74, and a second action entity 75 joined to the goal entity 72 by a second connector 76. In the illustrated screenshot 70, a precondition entity 77 has been added, and the user has already drawn a connecting line 78 between the precondition entity 77 and the second connector 74. FIG. 8 illustrates a seventh screenshot 80 in which the objects 82, 83, 85, 86, and 87 have been rearranged relative to their positions in FIG. 7. In FIG. 8, the precondition entity 87 and the first action entity 83 are connected to the goal entity in a logical AND relationship, represented by an AND node 89 and a new connector 90. Accordingly, the goal entity 82 will assume a logical value of true when the logical value of the second action entity 85 is true or the logical values of both the first action entity 83 and the precondition entity 87 are true. It will be appreciated that the AND relationship was determined and the rearranging of the entities was accomplished in response to the drawing of a single line to the existing connector 74 in FIG. 7. Thus, with a few simple gestures, a user can quickly assemble a process diagram using a method in accordance with an aspect of the present invention.

Figure 9:
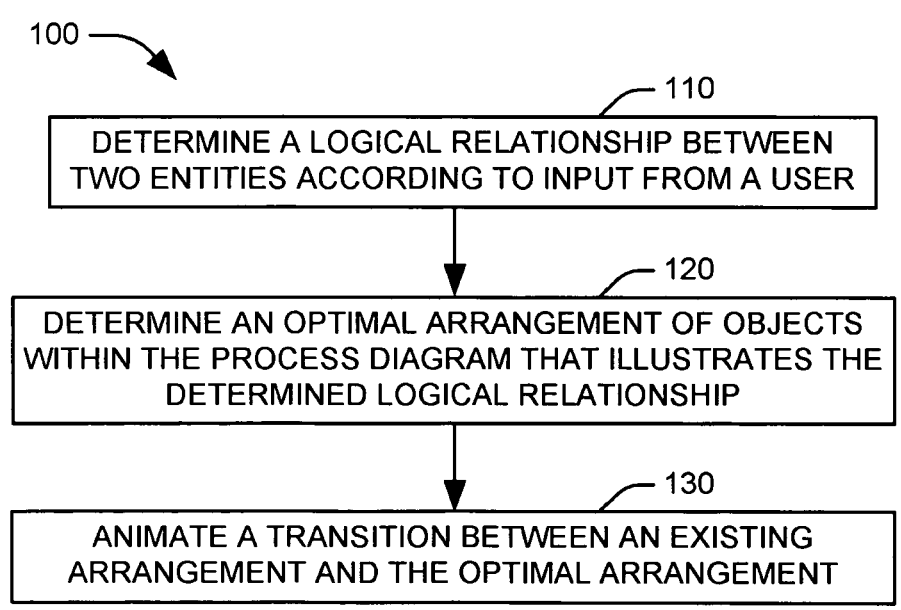
FIG. 9 illustrates a methodology for editing a process diagram in accordance with the aspect of the present invention.

In view of the foregoing structural and functional features described above, a methodology in accordance with various aspects of the present invention will be better appreciated with reference to FIG. 9. While, for purposes of simplicity of explanation, the methodology of FIG. 9 is shown and described as executing serially, it is to be understood and appreciated that the present invention is not limited by the illustrated order, as some aspects could, in accordance with an aspect of the present invention, occur in different orders and/or concurrently with other aspects from that shown and described herein. Moreover, not all illustrated features may be required to implement a methodology in accordance with an aspect the present invention FIG. 9 illustrates a methodology 100 for editing a process diagram comprising a plurality of objects including entities and connectors between entities. At 110, a logical relationship between two entities is determined according to input from a user. It will be appreciated that the user input need not explicitly define the relationship between the two entities, as the relationship often can be determined from one or more characteristics of the user input and/or one or more characteristics of the two entities. Using the example of a theory of constraints methodology, if the first entity is a goal entity and the second entity is a precondition entity, it can be determined without explicit instructions from the user that the precondition entity is intended to be subordinate to the goal entity. In an exemplary embodiment, the user input to be interpreted can be simple as a single line, such that a line drawn from a first entity to a second entity is interpreted as establishing a logical OR relationship between the first entity and any other subordinate entities to the second entity relative to the second entity and a line drawn from the first entity to an existing connection between the second entity and a subordinate third entity establishes a logical AND relationship between the first entity and the third entity relative to the second entity.

At 120, an optimal arrangement of objects within the process diagram is determined that illustrates the determined logical relationship according to at least one characteristic of the objects and at least one optimization criteria. For example, the entities and connectors can be arranged as to maintain the flow of the diagram in a desired direction, avoid crossover of the connectors, and maintain a desired spacing between entities. Similarly, entities having one or more entity categories (e.g., goal entities) can be maintained toward a first side of the diagram and entities from one or more other categories (e.g., precondition entities) can be maintained toward a second, opposite side of the diagram. It will be appreciated that the optimization criteria and the object characteristics used to determine the optimal arrangement will vary with the application.

At 130, a transition between an existing arrangement and the optimal arrangement is animated, such that the user can track the location of an entity of interest from the existing arrangement to the optimal arrangement. For example, a graphical engine associated with the process diagram can illustrate a gradual transition from the existing arrangement to the optimal arrangement over a number of video frames. It will be appreciated that a graphical engine associated with the process diagram can be operative to provide incremental automation of the diagram, such that an optimal arrangement is determined after each change in the diagram. According, every incremental change in the diagram can be represented in an animation, allowing the user to stay apprised of the results of each change to the process diagram.

Figure 10:
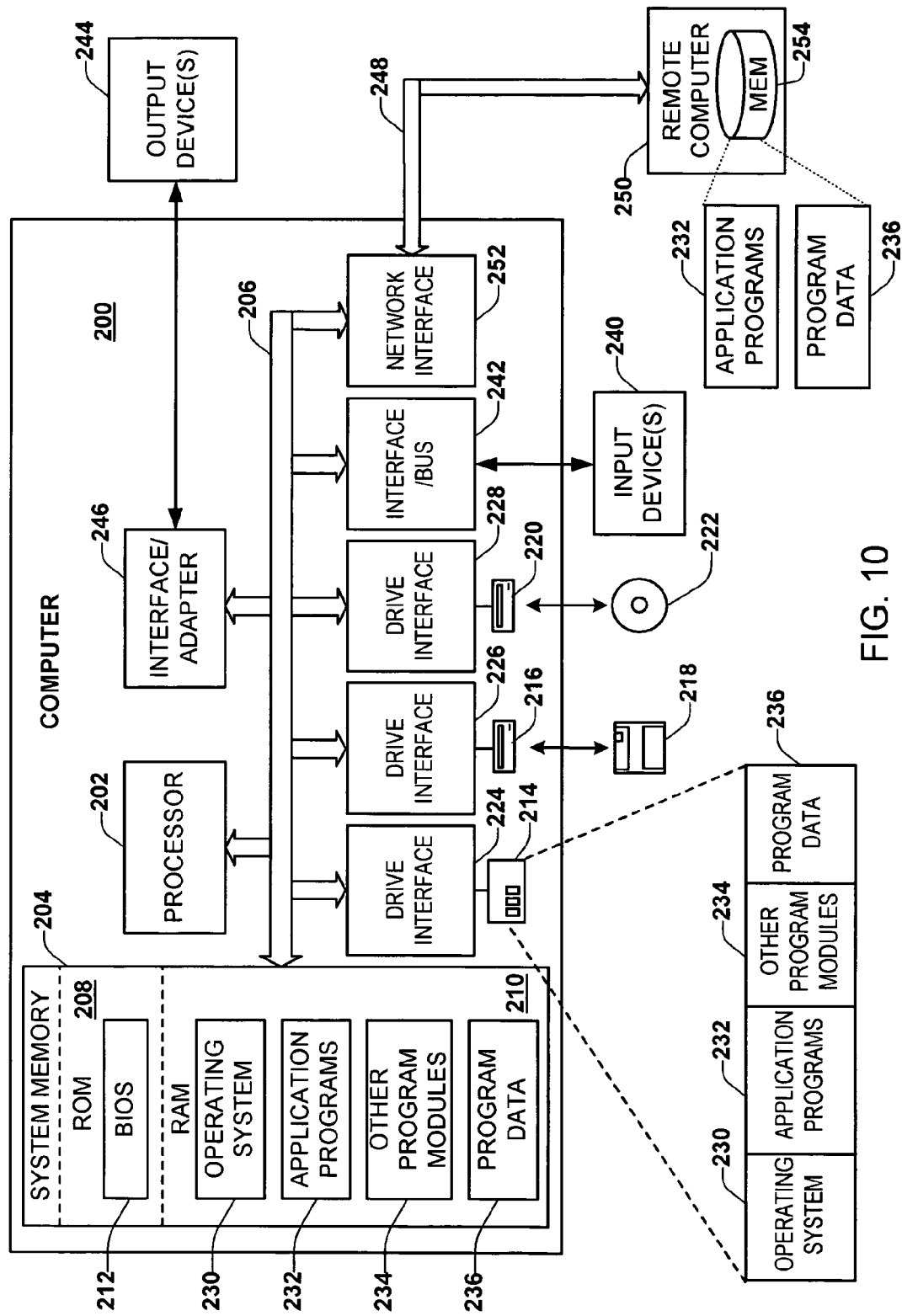
FIG. 10 illustrates a computer system that can be employed to implement systems and methods described herein.

FIG. 10 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including a coupling of the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, (e.g., to read from or write to a removable disk 218), and an optical disk drive 220, (e.g., for reading a CD-ROM or DVD disk 222 or to read from or write to other optical media). The hard disk drive 214, magnetic disk drive 216, and optical disk drive 220 are connected to the system bus 206 by a hard disk drive interface 224, a magnetic disk drive interface 226, and an optical drive interface 234, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital versatile disks and the like.

A number of program modules may also be stored in one or more of the drives as well as in the RAM 210, including an operating system 230, one or more application programs 232, other program modules 234, and program data 236.

A user may enter commands and information into the computer system 200 through user input device 240, such as a keyboard or a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 248 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer system that assists a user in creating a process diagram according to a specific methodology, comprising:
    a memory for storing computer executable instructions;
    a processing unit for accessing the memory and executing computer executable instructions;
    a template library stored in the memory comprising a plurality of entities associated with the methodology, each of the plurality of entities having an associated one of a plurality of entity categories;
    computer executable instructions stored in the memory comprising a user interface configured to allow a user to graphically insert entities from the library into the process diagram and graphically insert connections between the entities to display logical relationships between the entities on a display that define an original arrangement of the entities; and
    computer executable instructions stored in the memory comprising a graphical engine configured to generate an optimal arrangement of the entities for display on the display within the process diagram according to at least one characteristic of a plurality of entities and at least one connector displayed on the display associated with the process diagram and at least one optimization criteria when a user inserts an entity or connection, the graphical engine configured to animate a transition between the original arrangement and the optimal arrangement over a plurality of video frames on the display.

2. The system of claim 1, wherein the at least one optimization criteria includes maintaining an associated flow direction of the diagram, such that a given entity tends to be maintained at a point farther in the flow direction than at least one subordinate node associated with the given entity.

3. The system of claim 1, wherein the process diagram comprises a plurality of connectors and the at least one optimization criteria includes avoiding crossover of connectors within the process diagram.

4. The system of claim 1, wherein the specific methodology is a theory of constraints methodology, and the plurality of entity categories include at least one of goals, intermediate goals, desirable side effects, undesirable side effects, preconditions, and actions.

5. The system of claim 1, wherein the user interface is further configured such that at least one of a text font and a color palate associated with the display is fixed such that the user cannot alter it for a given instance of a process diagram.

6. The system of claim 1, wherein the user interface is further configured to allow a user to add entities to the process diagram and connect a first entity to an object associated with a second entity within the diagram.

7. The system of claim 1, wherein each of the plurality of entities has at least one associated attribute, with the at least one attribute of entities lacking subordinate entities being determined by the user and the corresponding at least one attribute of entities having at least one subordinate entity being determined by at least one associated attribute of the at least one subordinate entity.

8. The system of claim 7, where the associated at least one attribute includes a logical truth value of the entity.

9. The system of claim 1, wherein the specific methodology is a security decision making methodology and the plurality of entity categories include at least one of requirements, knowledge, indicators, and events.

10. A non-transitory computer readable medium having computer executable components for generating a process diagram according to a specific methodology, the computer executable components comprising:
 a template library a component configured to store a plurality of entities associated with the methodology, each of the plurality of entities having an associated one of a plurality of entity categories;
 a user interface component configured to allow a user to graphically add entities to the process diagram and connect a first entity to an object associated with a second entity within the diagram to define an original arrangement of the process diagram; and
 a graphical engine component configured to:
  display a logical relationship between the first entity and the second entity as a connector according to at least one characteristic of the object on a display;
  generate an optimal arrangement of a plurality of objects comprising the process diagram according to at least one characteristic of the objects and at least one optimization criteria; and
  animate a transition between the original arrangement of the process diagram and the optimal arrangement of the process diagram over a plurality of video frames.

11. The non-transitory computer readable medium of claim 10, wherein the at least one characteristic of the object includes an object type, such that the logical relationship between the first entity and the second entity will be displayed as a first type of logical connection when the object is the second entity and as a second type of logical connection when the object is a connector associated with the second entity.

12. The non-transitory computer readable medium of claim 11, wherein the first type of logical connection is a logical OR connection and the second type of logical connection is a logical AND connection.

13. The non-transitory computer readable medium of claim 10, wherein the object is the second entity and the at least one characteristic of the object includes the associated entity category of the second entity.

14. The non-transitory computer readable medium of claim 10, wherein the process diagram comprises a plurality of entities, and each of the plurality of entities has an associated logical truth value, with the logical truth values of entities lacking subordinate entities being determined by the user and the logical truth values of entities having at least one subordinate entity being determined by at least one associated truth value of the at least one subordinate entity.

15. The non-transitory computer readable medium of claim 10, wherein the specific methodology comprises a theory of constraints methodology, and the plurality of entity categories include at least one of goals, intermediate goals, desirable side effects, undesirable side effects, preconditions, and actions.

16. A non-transitory computer readable medium having computer executable instructions comprising a method for editing a process diagram, wherein the process diagram comprises a plurality of objects including entities and connectors between entities, the method comprising:
 determining a logical relationship between two entities according to input from a user provided through an input device;
 displaying the logical relationship between the two entities according to the input from the user on a display that defines an original arrangement of objects within the process diagram;
 determining an optimal arrangement of objects within the process diagram that illustrates the determined logical relationship on the display according to at least one characteristic of the objects and at least one optimization criteria; and
 animating a transition between the original arrangement and the optimal arrangement over a plurality of video frames displayed on the display such that the user can track the location of an entity of interest from the original arrangement to the optimal arrangement.

17. The non-transitory computer readable medium of claim 16, wherein determining a logical relationship between the two entities includes interpreting a single line drawn by the user to select one of at least two possible logical relationships between the two entities.

18. The non-transitory computer readable medium of claim 16, wherein the at least one optimization criteria includes maintaining an associated flow direction of the diagram, such that a given entity tends to be maintained at a point farther in the flow direction than its associated subordinate nodes, and avoiding crossover of connectors.

* * * * *